United States Patent [19]

Spurbeck

[11] Patent Number: 4,573,494

[45] Date of Patent: Mar. 4, 1986

[54] SPHERICAL BALL DRIVE MECHANISM FOR A DIRECT DRIVE VALVE

[75] Inventor: Kenneth C. Spurbeck, Kalamazoo, Mich.

[73] Assignee: Pneumo Corporation, Boston, Mass.

[21] Appl. No.: 695,700

[22] Filed: Jan. 28, 1985

[51] Int. Cl.[4] ............................................. F16K 31/52
[52] U.S. Cl. ............................... 137/331; 251/129.11;
251/58; 251/229; 251/251; 74/22 R; 74/49
[58] Field of Search ................. 251/133, 58, 229, 251;
74/22 R, 49; 137/331

[56] References Cited

U.S. PATENT DOCUMENTS

| 2,833,508 | 5/1958 | Bydalek et al. | 251/133 |
| 2,970,770 | 2/1961 | Bowman et al. | 137/331 X |
| 4,436,163 | 3/1984 | Simpson | 74/22 R |

FOREIGN PATENT DOCUMENTS 1183844  3/1970  United Kingdom ................ 251/133

Primary Examiner—Arnold Rosenthal
Attorney, Agent, or Firm—Renner, Otto, Boisselle & Lyon

[57] ABSTRACT

Spherical ball drive mechanism for directly coupling a rotary force motor to a valve member, includes a spherical bearing assembly at one end of the valve member. The spherical bearing assembly consists of an outer race member having a concave spherical inner bearing surface and a spherical bearing member having a convex spherical outer bearing surface complementary to the concave spherical inner bearing surface of the outer race member and received therein. The outer race member has a longitudinal axis substantially perpendicular to the longitudinal axis of the valve member and a transverse center axis radially offset from the longitudinal axis of the valve member. An eccentric output shaft of the rotary force motor extends substantially perpendicular to the longitudinal axis of the valve member for receipt in a longitudinal bore in the spherical bearing member.

11 Claims, 4 Drawing Figures

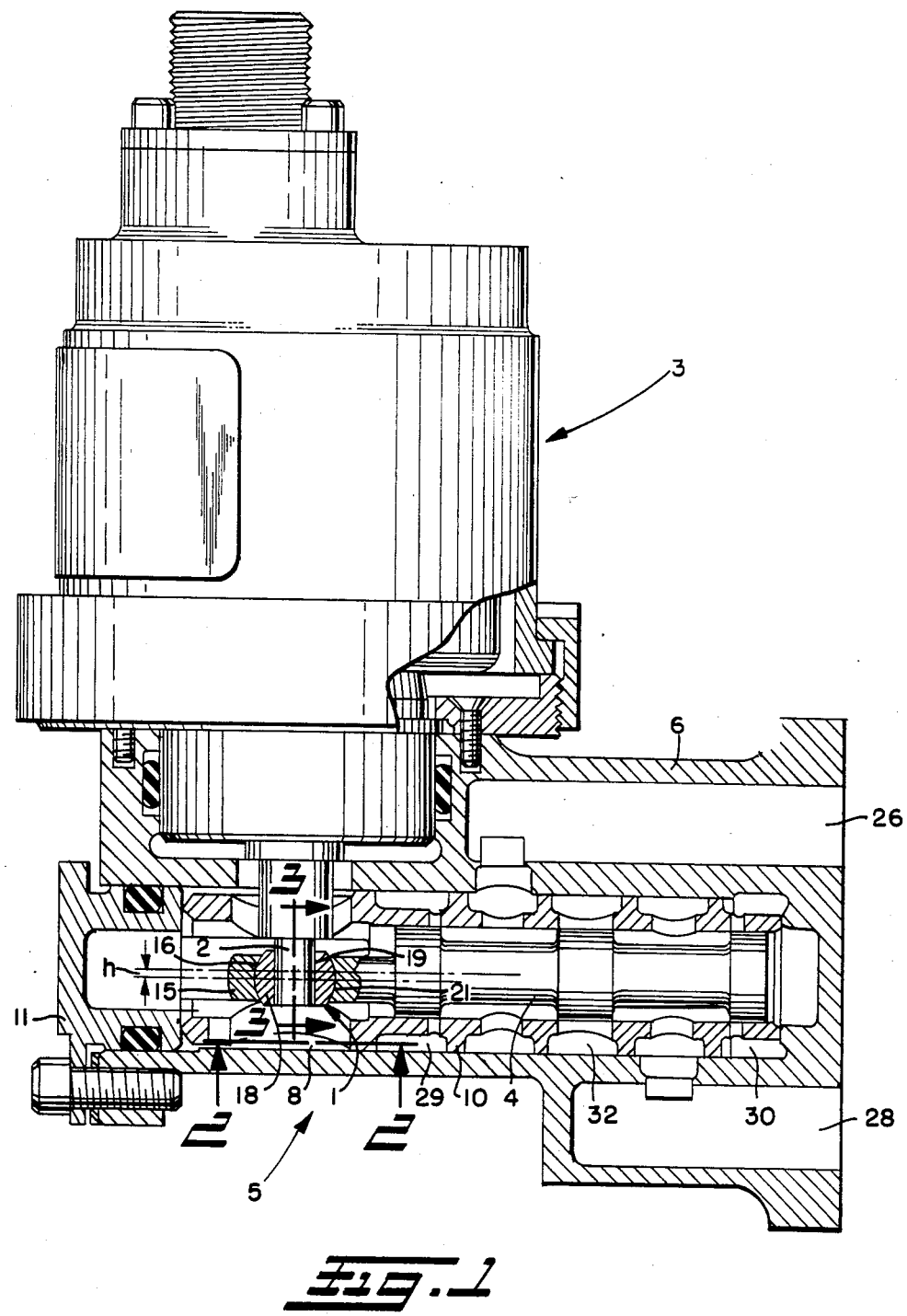

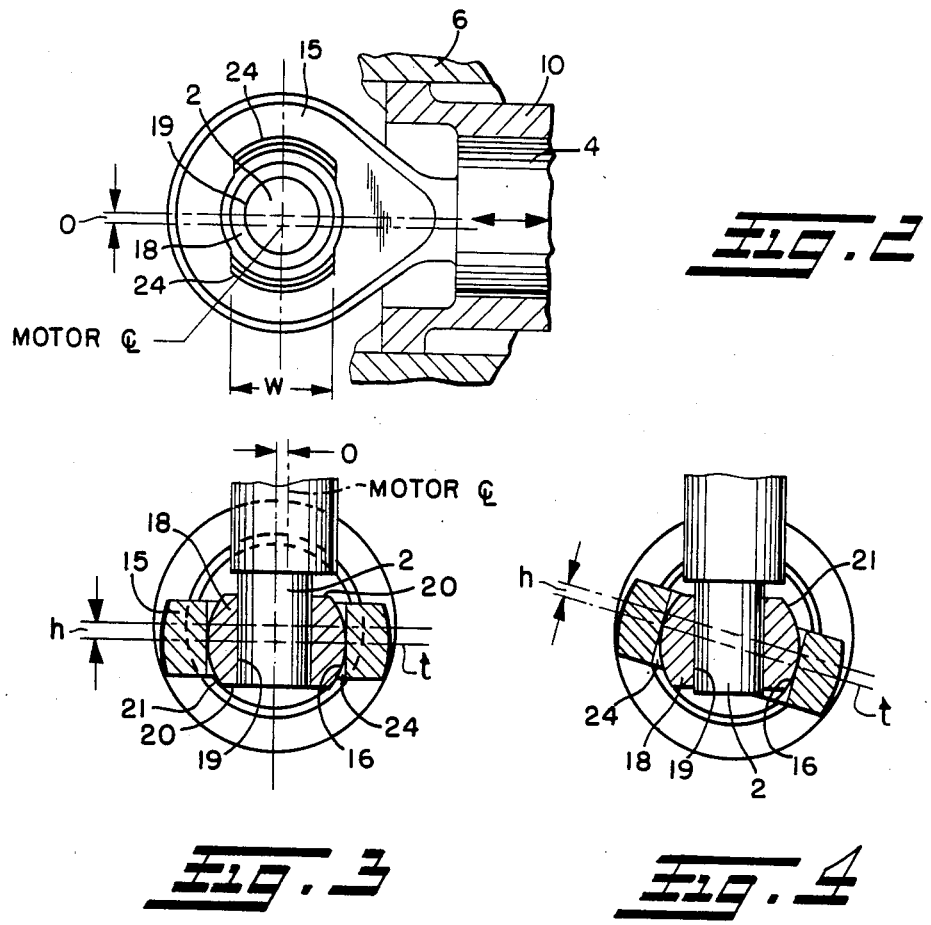

SPHERICAL BALL DRIVE MECHANISM FOR A DIRECT DRIVE VALVE

BACKGROUND OF THE INVENTION

This invention generally relates to a spherical ball drive mechanism for directly coupling a rotary force motor to a linear valve member.

In certain types of high pressure fluid porportional servo control systems such as control actuation systems for aircraft in which the fluid pressure may for example be on the order of 1000 psi or more, it has been found advantageous to use a direct drive valve of relatively short stroke.

The present invention relates to a spherical ball drive mechanism for directly coupling such a valve to a rotary force motor.

SUMMARY OF THE INVENTION

In accordance with one aspect of the invention, a spherical bearing assembly is provided on the valve member. The spherical bearing assembly includes an outer race member having a concave spherical inner bearing surface which forms the eye of the outer race member. Housed within the outer race member is a spherical bearing member having a longitudinal opening therein for receipt of an eccentric output shaft of a rotary force motor.

The eccentric output shaft rotates about a centerline that is substantially perpendicular to the longitudinal axis of the valve and has an eccentric offset that provides the gearing to transfer a relatively large motor angular rotation into a relatively short valve motion. Likewise, the longitudinal axis of the outer race member of the spherical bearing assembly is substantially perpendicular to the longitudinal axis of the valve. However, the transverse center axis of the outer race member is radially offset from such valve axis a distance at least as great as the eccentric offset. Accordingly, as the eccentric shaft rotates in either direction from its neutral or null position, both an axial force component and a transverse force component are applied to the valve causing both linear and rotational movement thereof.

In accordance with another aspect of the invention, the outer race member is preferably hardened whereby only the spherical bearing member is subject to wear.

In accordance with still another aspect of the invention, the outer race member has a pair of diametrically opposed entry slots therein to facilitate removal and replacement of the spherical bearing member in the event that the spherical bearing member should become worn.

In accordance with yet another aspect of the invention, the entry slots desirably extend completely through the outer race member to provide for the dumping of contaminants entering the outer race member through the slots instead of collecting therein.

To the accomplishment of the foregoing and related ends, the invention, then, comprises the features hereinafter fully described and particularly pointed out in the claims, the following description and the annexed drawings setting forth in detail a certain preferred embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through a direct drive valve and force motor assembly shown directly connected together by a preferred form of spherical ball drive mechanism in accordance with this invention.

FIG. 2 is an enlarged end elavation view, partly in section, of such sperical ball drive mechanism as generally seen from the plane of the line 2—2 of FIG. 1;

FIG. 3 is an enlarged fragmentary transverse section through the spherical ball drive mechanism of FIG. 1 taken substantially along the plane of the line 3—3 of FIG. 1 as seen when the valve is in the neutral or null position; and FIG. 4 is an enlarged fragmentary transverse section similar to FIG. 3 but showing the position of the spherical ball drive mechanism when the valve is moved out of the null position.

DETAILED DESCRIPTION OF THE PREFERRED EMBODIMENT

Referring now in detail to the drawings and initially to FIG. 1, there is shown a preferred form of spherical ball drive mechanism 1 in accordance with this invention for directly coupling an eccentric output shaft 2 of a rotary force motor 3 to a linearly movable valve plunger 4 of a valve assembly 5. The motor 3 may be clamped or otherwise secured to the housing 6 of the valve assembly 5 with its eccentric output shaft 2 extending perpendicularly into a longitudinal bore 8 in the valve housing. Contained within the bore 8 is a valve sleeve 10 which may be held against movement as by means of a closure member 11 suitably retained in the outer end of the bore. Axially movable within the valve sleeve is the valve plunger 4.

As clearly shown in FIGS. 1-4, the spherical ball drive mechanism 1 includes an outer race member 15 that may be integrally formed or otherwise attached to one end of the valve plunger 4. The outer race member has a conical spherical inner bearing surface 16 which forms the eye of the outer race member. Housed within the outer race member is a spherical bearing member 18 having a through bore 19 in which the eccentric output shaft 2 of the rotary force motor is received. The spherical bearing member 18 is in the shape of a truncated ball having flat ends 20 and a convex spherical outer surface 21 which is complementary to and has a radius slightly less than that of the concave spherical inner bearing surface 16 of the outer race member 15.

The outer race member 15 is provided with a pair of diametrically opposed entry slots 24 (FIGS. 2-4) which may be machined or otherwise formed into the eye of the outer race member. The slots extend transversely across the inner bearing surface 16 as shown, and have a radius approximately that of the spherical bearing member 18 and a chordal width W slightly greater than the axial thickness of the spherical bearing member whereby the spherical bearing member may readily be assembled within the outer race member by inserting the spherical bearing member edgewise through the slots 24 and rotating same to the position shown in the drawing. To remove the spherical bearing member from the outer race member, the assembly procedure is reversed. That is, the spherical bearing member 18 is rotated to bring the spherical bearing member into edgewise alignment with the slots 24 so that the spherical bearing member can be removed through the slots. Preferably, such entry slots 24 extend completely through the outer race member 15 as shown in FIGS. 3 and 4 to allow for the unobstructed passage (flow) of any contaminants that may be present in the hydraulic fluid within the valve housing entering the outer race member through the slots instead of collecting within the outer race member.

The eccentric output shaft 2 rotates about a centerline that is substantially perpendicular to the longitudinal axis of the valve member 4 and has an eccentric offset o (see FIGS. 2 and 3) that provides the gearing to transfer a relatively large motor angular rotation into a relatively short valve motion. Likewise, the longitudinal axis of the outer race member 15 is substantially perpendicular to the longitudinal axis of the valve member, and the transverse center axis of the outer race member is parallel to but radially offset from such valve axis by a distance h that is at least as great as the eccentric offsets o. Accordingly, as the eccentric shaft 2 rotates in either direction from its neutral or null position, two force components are applied to the valve 4, namely, an axial force component that causes linear movement of the valve, and a radial or transverse force component that is compensated for by rotation of the outer bearing race member 15 and thus the valve relative to the spherical bearing member 18 between the positions shown in FIGS. 3 and 4. During such valve rotation form the FIG. 3 position to the FIG. 4 position and return, the spherical bearing member 18 will move axially along the eccentric shaft 2 as shown to compensate for the valve rotation.

When the valve 4 is in the valve null position shown in FIG. 1, fluid flow to and from the cylinder ports 26, 28 is blocked. Controlled selected movement of the valve 4 by the rotary force motor 3 will cause the valve to move out of the null position respectively to connect one of the cylinder ports 26, 28 to a system supply pressure groove 29 or 30 in the valve housing 11 and the other cylinder port to the system return pressure groove 32.

In a typical installation, the eccentric offset o may for example be 0.040 inch to provide a maximum valve stroke of ±0.040 inch during rotation of the eccentric shaft 2 through approximately ±24° from the null position. If the transverse center axis t of the outer race member 15 is radially offset from the valve axis by a distance h of approximately 0.100 inch, the spherical bearing member 18 will be caused to rise approximately 0.008 inch during the maximum valve rotation.

Such a spherical ball drive mechanism 1 has the advantage that the spherical bearing member 18 is retained in place by the outer race member 15 during insertion of the eccentric motor shaft 2 into the spherical bearing member and under load. Accordingly, all that is necessary to maintain the assembly is a simple slip fit between the eccentric shaft 2 and the bore 19 in the spherical bearing member, whereby the motor may readily be connected and/or disconnected from the valve member by a simple pushing or pulling motion.

The spherical bearing member 18 tolerances can also readily be held quite close, for example, to 0.0001 inch, thereby substantially eliminating any backlash effects. Such a spherical ball drive mechanism also permits a relatively large force to be transmitted from the motor to the valve to overcome any chip shear loads without causing undue wear to the spherical ball drive mechanism because of the spherical contact between the spherical ball member 18 and outer race member 15 which distributes the load over a greater area. Moreover, the frictional loads transmitted through the spherical ball drive mechanism are relatively low, and jamming is unlikely in the rotation of the eccentric shaft 2, since if the spherical bearing member 18 should become jammed on the eccentric shaft, the rotation of the eccentric shaft can be transferred to the spherical bearing member which is free to rotate within the outer race member 15. Also, the outer race member is desirably hardened whereby only the spherical bearing member 18 is subject to wear and can easily be replaced with a new spherical bearing member which may readily be matched to maintain the required tolerances.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. In combination, a linear valve member and a rotary force motor, and a spherical ball drive mechanism for directly coupling said rotary force motor to said valve member, said spherical ball drive mechanism comprising a spherical bearing assembly attached to said valve member, said spherical bearing assembly comprising an outer race member having a concave spherical inner bearing surface, said outer race member having a longitudinal axis substantially perpendicular to the longitudinal axis of said valve member and a transverse center axis radially offset from the longitudinal axis of said valve member, and a spherical bearing member received in said outer race member, said spherical bearing member having a convex spherical outer bearing surface complementary to the concave spherical inner bearing surface of said outer race member, and said rotary force motor having an eccentric output shaft extending substantially perpendicular to the longitudinal axis of said valve member for connection to said spherical bearing member.

2. The combination of claim 1 wherein the radial offset of the transverse center axis of said outer race member is greater than the offset of said eccentric output shaft relative to the centerline of said motor.

3. The combination of claim 1 wherein said spherical bearing member is at one end of said valve member.

4. The combination of claim 3 wherein said outer race member is integral with said valve member.

5. The combination of claim 1 wherein said eccentric output shaft has a slip fit in a longitudinal bore in said spherical bearing member.

6. The combination of claim 1 wherein said outer race member has entry slots therein of a width slightly greater than the axial thickness of said spherical bearing member to facilitate insertion and removal of said spherical bearing member into and out of said outer race member.

7. The combination of claim 6 wherein siad entry slots extend completely through said outer race member to provide for the free flow of hydraulic fluid through said slots.

8. The combination of claim 6 wherein said outer race member is hardened whereby only said spherical bearing member is subject to wear and can readily be replaced with a new spherical bearing member.

9. In combination, a linear valve member and a rotary force motor, and a spherical ball drive mechanism for coupling said rotary force motor to said valve member, said spherical ball drive mechanism comprising a spherical bearing assembly at one end of said valve member, said spherical bearing assembly comprising an outer race member having a longitudinal axis substantially perpendicular to the longitudinal axis of said valve member and a transverse center axis radially offset from the longitudinal axis of said valve member, and a spherical bearing member received in said outer race member, said rotary force motor having an eccentric output shaft extending substantially perpendicular to the longitudinal axis of said valve member for receipt in a longitudinal bore in said spherical bearing member, the radial offset of the transverse center axis of said outer race member relative to the longitudinal axis of said valve member being greater than the offset of said eccentric output shaft relative to the centerline of said motor.

10. The combination of claim 9 wherein said eccentric output shaft has a slip fit in the longitudinal bore in said spherical bearing member to facilitate insertion and removal of said eccentric output shaft into and out of said spherical bearing member.

11. The combination of claim 9 wherein said outer race member has entry slots therein of a width slightly greater than the axial thickness of said spherical bearing member to facilitate insertion and removal of said spherical bearing member into and out of said outer race member, said entry slots extending completely through said outer race member to provide for the free flow of hydraulic fluid through said slots.

* * * * *